Nov. 8, 1955     D. C. GERBER ET AL     2,722,993
SUCTION CLEANER HAVING REPLACEABLE MAGAZINE
FED DIRT ENTRAPPING FILTER CONTAINER
Filed Sept. 1, 1951     5 Sheets-Sheet 1
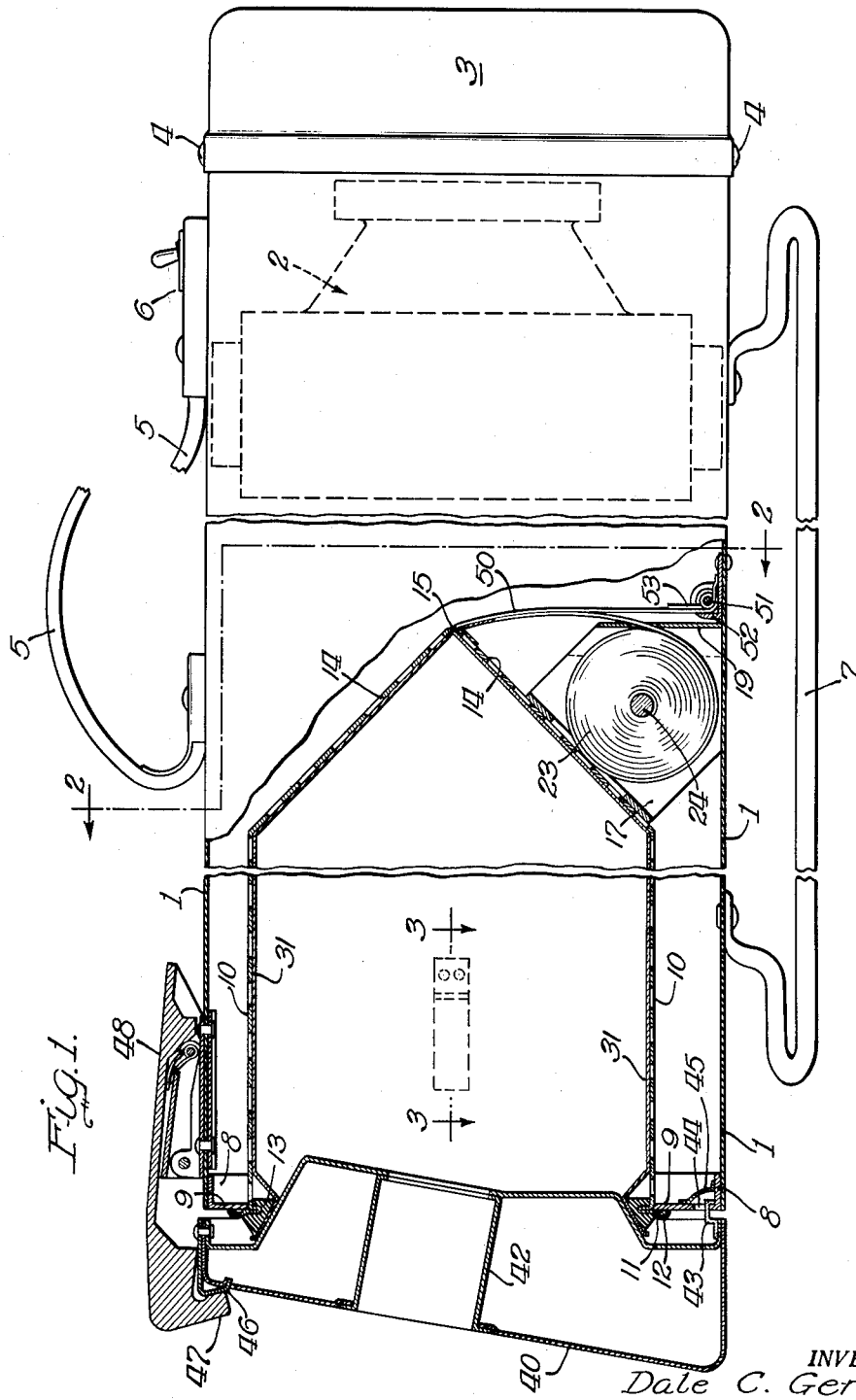
INVENTORS:
Dale C. Gerber
Werner G. Seck
By: Harry S. Dumarse
Atty.

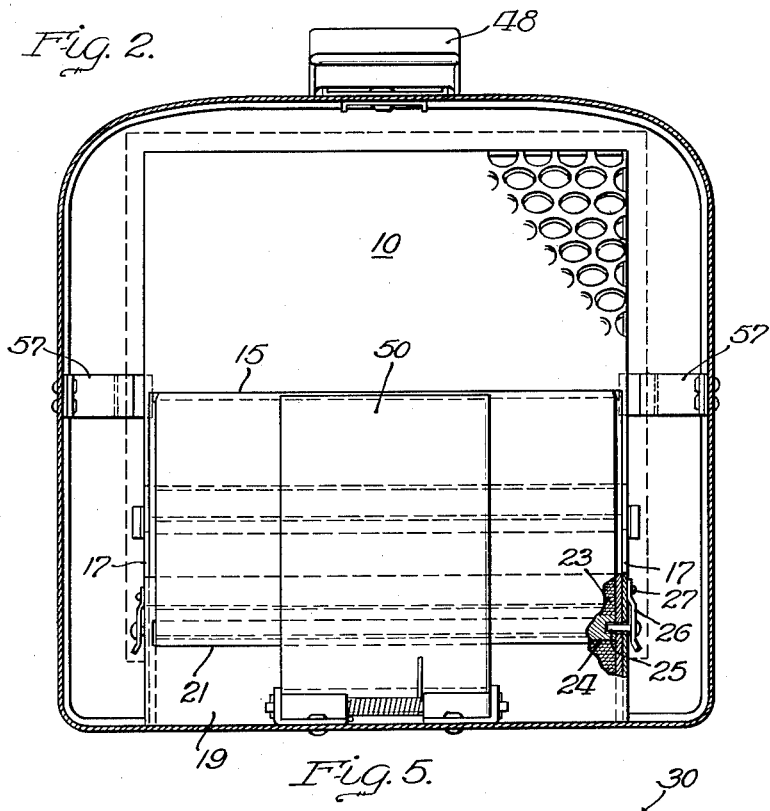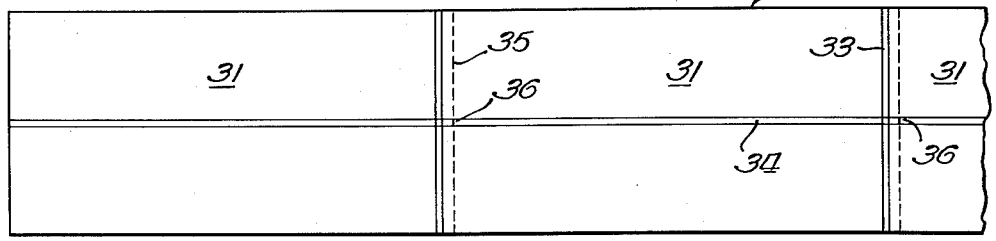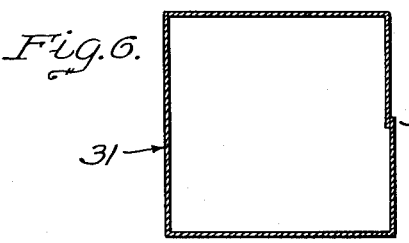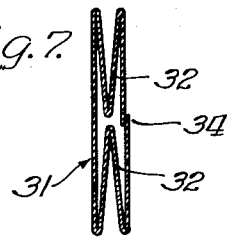

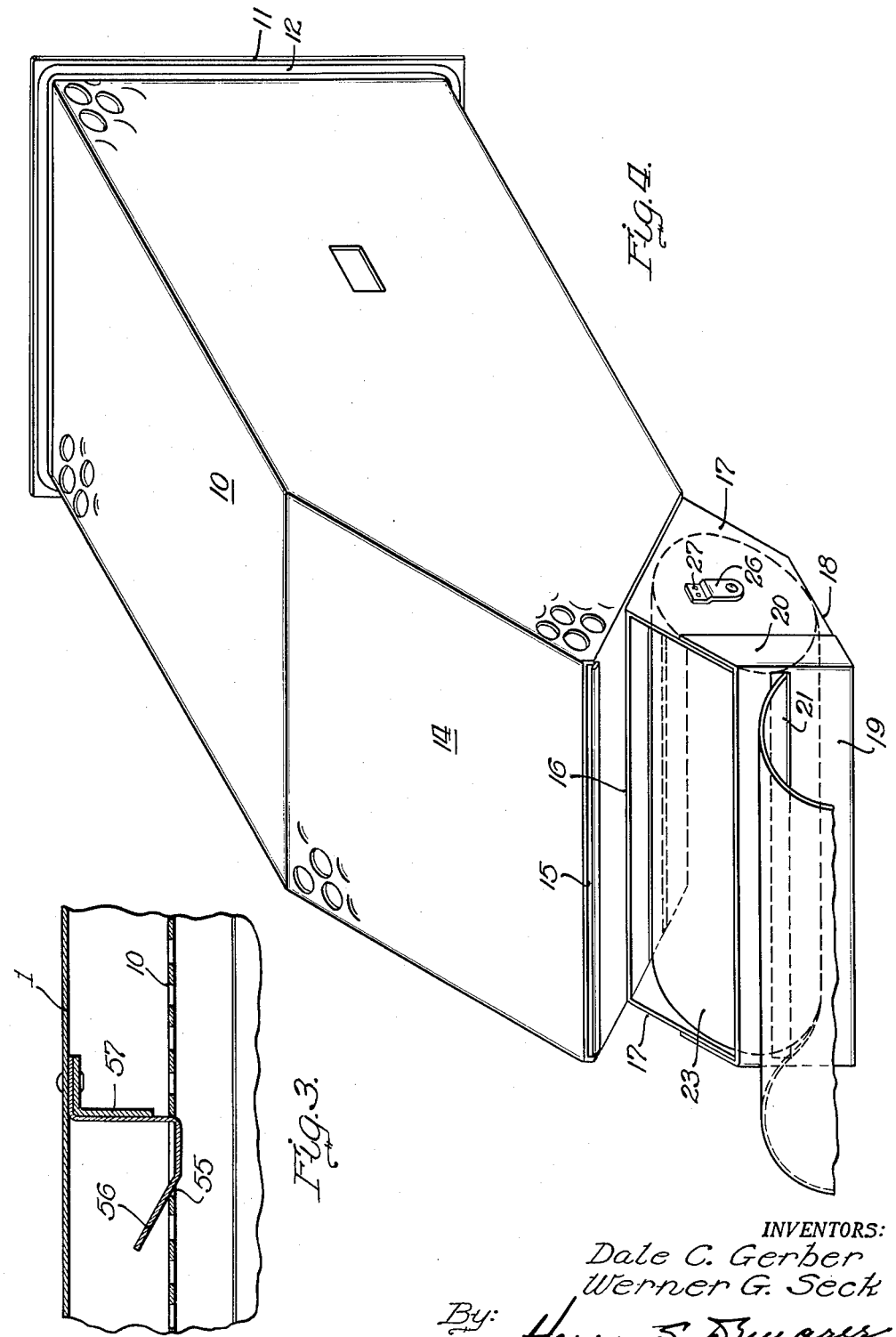

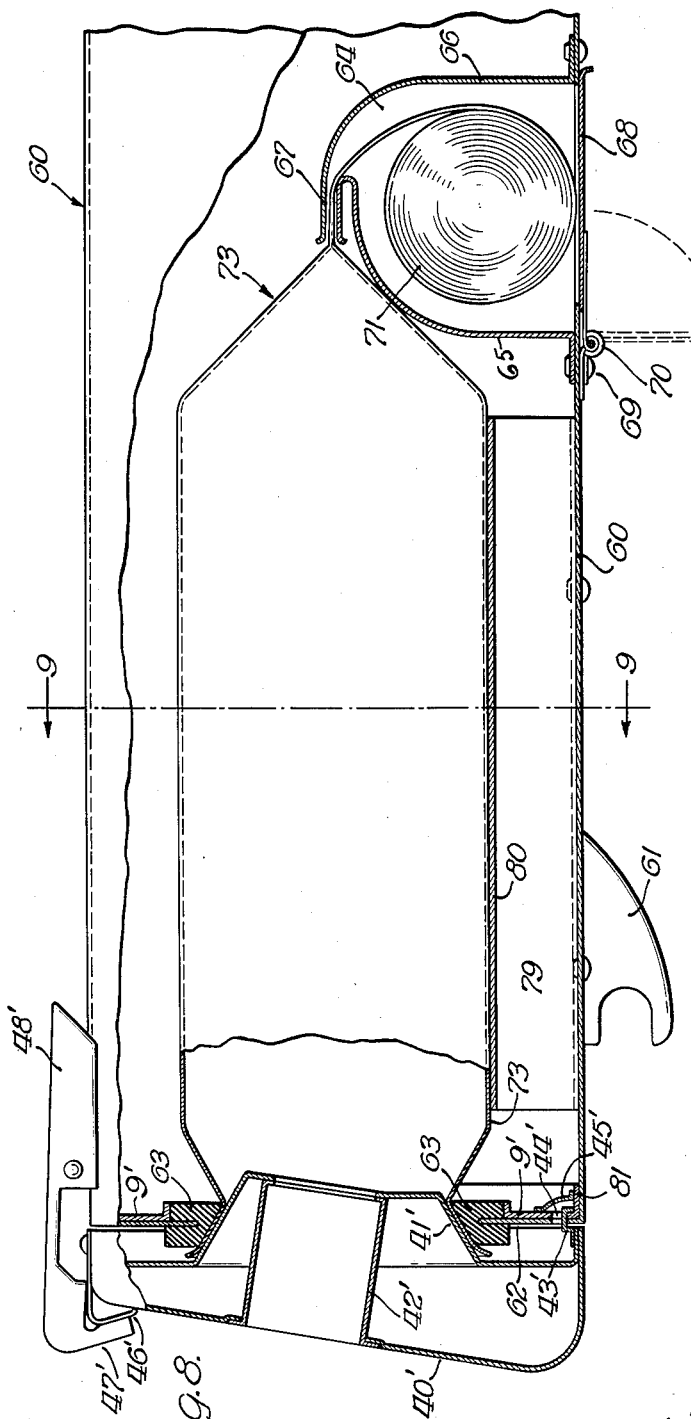

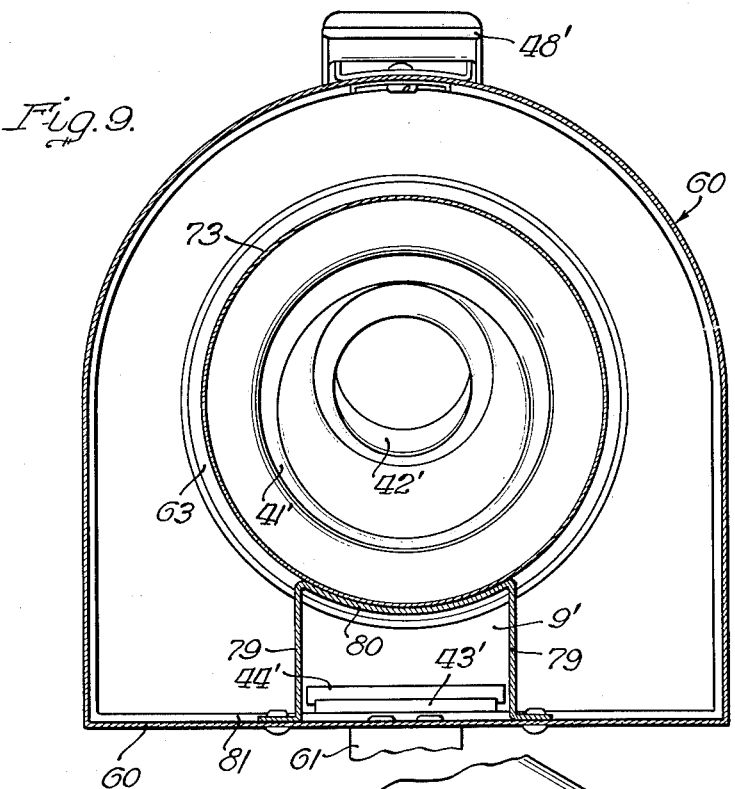
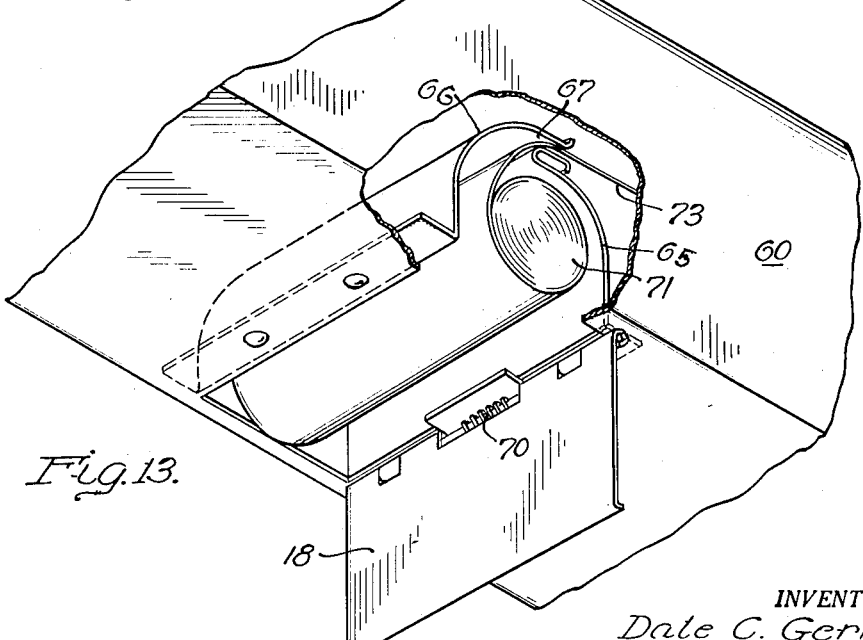

United States Patent Office 2,722,993
Patented Nov. 8, 1955

2,722,993

SUCTION CLEANER HAVING REPLACEABLE MAGAZINE FED DIRT ENTRAPPING FILTER CONTAINER

Dale C. Gerber, North Canton, and Werner G. Seck, Canton, Ohio, assignors to The Hoover Company, North Canton, Ohio, a corporation of Ohio Application September 1, 1951, Serial No. 244,782

20 Claims. (Cl. 183—37)

The present invention relates to the art of suction cleaning devices and in particular to a novel arrangement whereby a number of filter sacks, preferably of paper, are retained in the unit in such manner that the act of removing a used sack automatically feeds a new filter sack into operative position within the cleaner.

It is an important object of the present invention to provide a suction cleaner carrying a magazine containing a plurality of continuously connected paper filter containers which may be fed into operative position in the cleaner at the will of the operator and which function to entrap collected dirt completely so that the same may be disposed of along with a used filter sack.

It is a further object of the invention to provide a suction cleaner filter in the form of a magazine containing a plurality of individual filter sacks, connected by a tear-off point, which are made from a continuous strip of filter paper.

It is a further object of the present invention to provide a filter sack strip constructed of a single strip or sheet of filter fabric having its edges bonded together to form a tubular body and its inside faces bonded at spaced points to form a plurality of filter sacks sealed from each other and joined by weakened sections of the strip to facilitate separating of a used sack as by tearing the same from the strip of unused sacks.

Other objects and advantages of the invention will become apparent as the description proceeds when taken in connection with the accompanying drawings in which:

Figure 1 is a side elevational view in section illustrating a suction cleaner embodying the present invention;

Figure 2 is a transverse sectional view taken along the lines 2—2 of Figure 1 and looking in the direction of the arrows;

Figure 3 is a fragmentary sectional view taken along the lines 3—3 of Figure 1 and looking in the direction of the arrows;

Figure 4 is a perspective view of a filter magazine and supporting cage structure embodied in the apparatus illustrated in Figure 1;

Figure 5 is a view of a length of filter strip embodying several individual filter bags;

Figure 6 is a sectional view of the filter member of Figure 5 showing the same in its expanded or inflated condition;

Figure 7 is a sectional view of the filter structure of Figure 5 showing the same in its folded, collapsed condition;

Figure 8 is a partial side sectional elevational view of a cleaner embodying a modified form of the invention;

Figure 9 is a transverse sectional view taken along the lines 9—9 of Figure 8 and looking in the direction of the arrows;

Figure 10 is a view of the modified form of the filter structure showing several individual filter bags;

Figure 11 is a sectional view of the filter structure of Figure 10 in its inflated condition;

Figure 12 is a transverse sectional view of the filter in Figure 10 in its folded or collapsed condition; and Figure 13 is a partial perspective view of a portion of the apparatus of Figure 8 illustrating the mounting and replacing arrangement for the filter magazine.

Referring now to Figures 1 to 7, inclusive, the invention is illustrated as being applied to a floor supported cylinder or tank type cleaner, but the invention is also applicable to other types of suction cleaning apparatuses. The illustrated apparatus comprises an elongated main casing 1 which is substantially rectangular in cross-section as illustrated in Figure 2. The ends of the casing 1 are open to receive end cap members to be described hereinafter. A motor driven suction fan unit 2, which may be of any desired type, is indicated in outline only in Figure 1. The right hand end of the casing 1, as viewed in Figure 1, is closed by a suitable end cap 3 secured to the casing 1 by means of cap screws 4. The end cap 3 will be provided with the usual opening or openings for the discharge of filtered cleaning air. A carrying handle 5 and an electrical switch 6 for controlling the operation of the motor-fan unit are mounted on the top of the casing 1. The casing 1 is supported from a supporting surface by suitable rod-type skids 7 which are secured to the bottom portion thereof.

An annular ring 8 is secured internally to the casing 1 at the left hand end thereof and is provided with an annular flange 9 extending inwardly of the casing 1. An elongated rectangular section filter supporting casing 10, preferably of perforated metal, is mounted in the casing 1 adjacent the left hand end thereof. The member 10 is hollow and is provided with an outwardly directed flange 11 at its outer end. The flange 11 is crimped to secure a gasket 12, of rubber or other suitable material, which bears against the other face of the flange 9 in the assembled position of the parts to provide an air seal at this point. The flange 11 also has an inwardly extended section which carries a tapered rubber seating gasket 13 for a purpose to be described more fully hereinafter. The inner end of the rectangular casing 10 is closed by a pair of inclined perforated plates 14 which stop short of a meeting point to define a transverse slot 15 at their apex.

The lower surface 14, as viewed in Figure 1, carries a plate 16 having downwardly and rearwardly extending flanges 17 at opposite sides thereof. The lower edges of the flanges 17 are cut off along the line indicated at 18 parallel to the bottom of the filter container in order to rest upon the lower inner surface of the casing, as shown in Figure 1. The open rear end of the space between the projecting flanges 17 is closed by means of a plate 19 having side wings 20 overlapping and secured to the rear portion of the flanges 17. The plate 19 is provided with an elongated slot 21 for a purpose to be explained hereinafter.

Referring to Figure 2, a small part thereof is broken away and sectioned to illustrate the mounting of the filter supply on the flanges 17. The ends of a spindle 24, only one shown, are recessed to receive pivot pins 25 which are carried by leaf spring members 26 riveted at 27 to the flanges 17 and biased to project the pins 25 inwardly through the flanges 17 into holes in the ends of the spindle 24. The spindle 24 is readily removed from the flanges 17 by springing the members 26 outwardly to disengage the pins 25 from the spindle 24. A strip 23 of filter sacks is wound on the spindle 24 to be fed into the filter casing 10 in a manner to be described hereinafter.

Each filter sack strip 23 consists of a continuous length of filter stock 30 fabricated into a plurality of tubular filter sacks 31 integrally joined together and readily separable from each other. The strip 30 is folded flat as shown in Figure 7 by forming a pair of pleats 32 which extend towards each other and substantially abut at their apexes at the center of the strip 30. The filter bag strip is formed from a single strip of suitable material, such as paper, which is taken from a stock source of material, such as a roll. Transverse narrow bands 33 of suitable cement, such as a thermo-setting plastic, are applied to one face of the stock and are spaced longitudinally a distance equal to the desired length of the finished filter sacks. A narrow band 34 of such cement is also applied in a continuous strip along one edge of the stock. After application of the cement, the stock strip is folded and pleated in a manner shown in Figure 7 with the transverse bands of cement inside thus forming a tubular body with the edge cemented face of the stock strip overlying and contacting the uncemented edge thereof. The strip is then flattened and heat is applied to the cement-carrying parts thereof, by heated rollers for example, causing the cement to flow into the fibres of the fabric and to set, thereby securing the contacting cement-carrying parts of the stock firmly together and completing the individual but integrally connected bags. Along the longitudinal seam, the cement strip 34 forms a continuous unbroken bond creating the desired tubular formation of the body. The transverse bands of cement 33 are inside the tubular body and firmly cement each inner face of the unpleated walls of the strip to the inside faces of the pleats. The pleats are cemented firmly together at their abutting apexes. The foregoing produces a continuous series of tubular filter bags which are hermetically sealed at their ends and along the meeting edges at the seams 34. After completion of the cementing process, tear-off perforations 35 are formed in the strip just rearwardly of each transverse seam in order that the sacks may readily be torn from the strip as it is used and leaving a free open mouth on the leading sack of the strip. The longitudinal seams are lanced through as indicated at 36 in order to be certain that this comparatively high strength portion of the bag does not interfere with the tearing operation.

The sack strips 23 are wound on spindles 24 to a depth sufficient to provide approximately fifteen complete filter sacks for example. The rolls are then mounted in the magazine supporting structure formed by the flanges 17. The end of the strip is threaded through the openings 21 and 15 and the mouth of the leading sack is opened and seated against the rubber seating and sealing gasket 13. The leading, operative sack is secured in air tight relation against the gasket 13 by means of an end cap 40 which is provided with a projecting conical pilot member 41 dimensioned to engage against the filter and support the same in firm engagement with the gasket 13. The cap structure 40 has a passageway 42 opening into the interior of the filter 31 and adapted to receive the usual suction hose. The cap 40 is provided with a small hook member 43 which engages in an opening 44 formed in the flange 9 for anchoring the lower part of the cap. A shield member 45 is bridged between the flange 9 and the ring 8 in order to air-seal the opening 44 without interfering with the operation of the anchoring hook 43. The upper side of the cap carries a spring tab 46 which is engaged by an anchoring hook 47 formed on a conventional toggle latch 48 carried by the casing 1. The toggle latch forces the conical member 41 into firm engagement with the filter and gasket 13.

When the power plant 2 is energized, the suction effect on the interior of the casing 1 inflates the leading sack into supporting engagement with the filter support 10 as shown in Figure 1. The large perforations in the support 10 provide free passage for filtered air from the filter sack into the casing 1.

A slight drag on the filter strip is provided by means of a curved plate 50 supported upon a pintle 51 carried by brackets 52 which are secured to the bottom wall of the casing 1 rearwardly of the filter supporting and magazine structure. A torsion spring 53 wrapped about the pintle 51 presses the plate 50 against the filter strip and peaked end of the support 10 to provide a drag on the filter strip as the same is fed from the roll 23.

After the filter sack in operative position within the support 10 becomes charged with collected dirt, the filter is replenished by the following procedure. The casing 1 is placed upright resting upon the end cap 3. The end cap 40 is removed from the cleaner which exposes the operative and dirt charged filter sack 31. That portion of the filter 31 engaging the gasket 13 and conical seat member 41 will be clean so that the operator may grasp this portion of the bag to close the open end by folding or other suitable means without encountering dirt. When the open end of the sack is closed, it is withdrawn from the casing 10 together with the dirt it contains which action unreels a fresh filter sack from the roll 23. When the perforated mouth portion of the new sack is brought to the top of the cleaner, the old sack is torn loose from the new one and ultimately disposed of. The new sack is then placed in operative condition by the procedure heretofore outlined.

The support 10 is provided with openings 55 in opposite side walls thereof positioned to be engaged by spring latches 56 mounted on brackets 57 secured to the side walls of the main casing 1. If it is desired to remove the support 10, to replenish the magazine, for example, the casing 1 is placed upright resting on the end cap 3, the end cap 40 is removed and the operator reaches in and depresses the latches 55 to permit the support 10 to be slid longitudinally outwardly of the casing 1. The end portion of the support 10 carrying the magazine structure can be removed through the opening in the flange 9 by imparting a rocking movement to the support 10 as the magazine portion thereof is brought adjacent the opening in the flange 9. This permits the support 10 to be rocked through the opening after which a new roll 23 can be applied to the magazine structure and the support replaced by rocking the magazine in through the opening in the flange 9 and then sliding the support 10 longitudinally in the casing 1 until the latch spring 55 engages the opening 56.

The modified form of the invention disclosed in Figures 8 to 13 is similar in many respects to that described above in connection with Figures 1 to 7. It is, however, a simplified and less expensive structure though characterized by less effective filter support and comparatively smaller net effective filtering area. Certain portions of the apparatus illustrated in Figures 8 to 13 are identical with corresponding portions of the apparatus described above in connection with Figures 1 to 7 and are therefore given the same reference characters distinguished by the addition of a prime. The casing 60 is half-round at its top portion and rectangular at its bottom portion as shown in Figure 9. The power plant, carrying handle and switch mechanism are not illustrated in connection with this form of the invention, it being understood that these parts will be substantially identical with those used in the form of the invention illustrated in Figures 1 to 7. The forward part of the casing 60 is provided with a small supporting skid 61 for supporting the structure upon the floor and also for providing a cord winding track. The rear end of the casing may be supported upon wheels or a pair of the brackets 61, as desired.

An annular plate 62 is secured in any desired manner as by spot welding to the flange 9' and carries an annular supporting and sealing gasket 63 on its inner edge which corresponds to the gasket 13. The gasket 63 is shaped to cooperate and firmly engage the mouth of a filter sack positioned between the gasket 63 and a conical pilot seating member 41' on the end cap 40'.

A magazine chamber 64 is formed in the casing 60 by means of a pair of wall members 65 and 66 secured to the bottom of the casing 60 and extending side to side thereon. The members 65 and 66 curve toward each other at their upper portions and have their end portions positioned in spaced relation to define a slot 67. Access to the chamber 64 is obtained by means of a door 68 supported by a hinge 69 secured to the bottom wall of the casing 60. The hinge 69 incorporates a closure spring 70 arranged to bias the door 68 to the closed position, illustrated in full lines in Figure 8, with sufficient force to support the weight of a full filter roll 71 mounted in the chamber 64.

The filtering roll 71 used in this form of the invention comprises a continuous strip 72 of filter sacks 73 integrally joined and hermetically sealed from each other. The filter material is supplied from the source of manufacture in the form of a continuous sheet which may be in a roll or flat folds. The sheet is withdrawn from the filter stock and narrow transverse bands of cement, such as a thermo-setting plastic, 74 are applied to one face of the sheet at spaced intervals. Narrow bands of cement 75 are also applied along the edge of the stock strip after which the same is folded with the cement bands 74 and 75 inside to bring the cemented edges of the strip into engagement as shown in Figure 12. The tubular body thus formed is flattened and heat is applied to the plastic cement to cause the same to adhere and seal, resulting in a continuous series of completely closed tubular filter bags integrally joined together. The continuous filter sack strip is then perforated as indicated at 76 just rearwardly of each transverse seal 74. The cemented edge is lanced through as indicated at 77 to prevent this relatively strong portion of the structure from interfering with the process of separating a used sack. The completed filter strip is then formed into a roll as indicated at 71 containing, for example, fifteen complete filter sacks. The filter roll 71 is placed in the chamber 74 and the free end thereof is threaded through the slot 67 so that it may be grasped by reaching in to the interior of the cleaner structure through the opening in the gasket 63. The leading filter sack is then withdrawn from the roll by applying a straight pull on the portion threaded through the slot 67 which unreels a complete sack at approximately the point at which the open mouth of the sack is in position to be seated on the gasket 63 and secured by the end cap conical pilot member 41'. After a sack has become charged with dirt, it may be removed for disposal and a fresh sack brought into operative position by the procedure heretofore described in connection with Figures 1 to 7.

A U-shaped plate 79 having a concave bight portion 80 is secured to the casing 60 between the end cap 40' and the filter magazine in that portion of the casing 60 which forms a filter chamber. The plate 79 provides mechanical support for the operative filter 75 and relieves the same of the weight of accumulated dirt which might otherwise tend to rupture the paper.

The filter 73 is circular in cross-section when inflated, as indicated in Figure 11, except for its rear end portion which tapers down to the flat longitudinal seam 74 which seals the inner end of the filter and separates it from the next succeeding filter sack in the magazine roll 71. The filter roll 71 is not supported on a pivot but unwinds by skidding on the smooth metal surface of the inner face of the door 68.

The form of the invention disclosed in Figures 8 to 13 is simpler and less expensive than that disclosed in Figures 1 to 7, but the filter is less effectively supported and has a lesser effective filtering area within the same limitations of filter roll length.

Our present invention provides a suction cleaner including a magazine composed of a plurality of integral and completely sealed filter sacks which may be brought into use successively as each sack becomes charged with dirt and is torn from the roll for disposal and replacement. The filter sack strip forming the sacks are formed from stock rolls of filter paper without forming, tailoring or other like cutting and fabricating operations which greatly reduces the cost of individual filter sacks and also greatly simplifies handling, packing, merchandising and utilization of the cleaner.

We claim:

1. Suction cleaning apparatus comprising a casing, a suction producing unit in said casing, an air inlet in said casing, a filter magazine in said casing, a roll of filter sacks in said magazine containing a plurality of connected and separable filter sacks, means for guiding filter sacks from said roll to a portion of said casing between said air inlet and said suction producing unit, and means for securing the open mouth portion of a filter sack in sealing relation to said air inlet.

2. Suction cleaning apparatus comprising a casing, a suction producing unit in said casing, an air inlet in said casing, a filter magazine in said casing, a continuous roll of filters in said magazine comprising a plurality of filter sacks each having a sealed bottom portion and a mouth portion detachably connected to the sealed bottom end of a preceding filter sack by a perforated portion of the roll of filters whereby each sack has a free open mouth portion when separated from a preceding sack and a sealed bottom portion connected to the sacks remaining in said magazine, means for guiding filter sacks from said magazine into a portion of said casing forming a filter chamber between said air inlet and said suction producing unit, and means for sealing the open mouth of a filter sack in said filter chamber around said air inlet whereby air must pass through said filter sack when flowing from said air inlet to said suction producing unit.

3. In a suction cleaning apparatus having a casing, a filter chamber in said casing, an air inlet to said chamber, a suction pump for causing air to flow through said air inlet and filter chamber, a filter magazine in said casing, a plurality of filter sacks in said magazine each having a sealed bottom portion and mouth portion joined to the bottom of the preceding filter along a tear line whereby the mouth portion of each filter is freed as the preceding filter is torn away therefrom, means for guiding filters from said magazine to said filter chamber, and means for securing the open mouth of the leading filter sack about said air inlet whereby air flowing through said passageway flows into said leading filter sack and is filtered as it passes through the walls thereof.

4. Suction cleaning apparatus comprising a casing, an air passageway in said casing including an air port, a suction pump for causing air flow through said passageway, a filter magazine in said casing, a plurality of filter sacks in said magazine each having a closed bottom portion and a mouth portion separably connected to the bottom portion of the preceding filter sack to form a continuous filter sack strip, means for guiding said filter strip from said magazine to said air passageway, and means for securing the mouth portion of the leading filter sack around said air port whereby air flowing through said port is filtered through the wall of said sack.

5. Apparatus according to claim 4 including a perforated filter support frame in said passageway positioned to receive the leading edge of said filter strip interiorly thereof from said guide means.

6. Apparatus according to claim 4 including a removable end member on said casing, and cooperating means on said removable end member and said casing for securing and sealing the mouth portion of said leading filter sack.

7. Apparatus according to claim 4 including a perforated filter support positioned in said passageway and having a portion thereof forming said filter guiding means and supporting said magazine, a removable member on said casing providing an opening for the insertion or removal of said support and said magazine, and cooperating means on said removable member and said support forming said filter sack mouth securing means.

8. Suction cleaning apparatus comprising a casing forming a filter chamber, a removable end cap for said casing having an air port therein for directing air into said filter chamber, a suction producing unit for causing air flow through said port, a filter magazine in said casing, a strip of filter sacks in said magazine comprising a plurality of tubular filter sacks each having a closed bottom portion and a mouth portion separably joined to the closed bottom portion of the preceding filter sack whereby the mouth portion of the leading filter sack is free, a perforated filter support frame in said casing having a rectangular cross-section and tapering at one end to form a narrow elongated slot forming a guide bar leading filter sacks from said magazine into said support, said filter sacks having in-folded portions whereby each sack may open into a rectangular section tube in said support tapering to a closed end at said slot, and co-operating means on said support and said end cap for clamping the mouth portion of the filter sack inside said support in position to receive air from said air port.

9. Suction cleaning apparatus comprising a casing forming a filter chamber, a removable end cap for said casing having an air port therein for directing air into said filter chamber, a suction producing unit for causing air flow through said port, a filter magazine in said casing, a strip of filter sacks in said magazine comprising a plurality of tubular filter sacks each having a closed bottom portion and a mouth portion separably joined to the closed bottom portion of the preceding filter sack whereby the mouth portion of the leading filter sack is free, a support plate in said filter chamber positioned to support the bottom portion of a filter sack in operative position in said chamber, and cooperating means on said end cap and said casing for clamping the mouth portion of the leading filter sack in position to receive air from said air port.

10. A filter pack for suction cleaners comprising an elongated strip of filter material folded flat with the longitudinal edges of said strip in juxtaposed relation and a pair of opposed V-shaped in-folds between the outer flat faces of the folded strip, means forming a continuous bond between said juxtaposed edges, and means forming a plurality of narrow bonds extending transversely of said strip at spaced intervals and bonding the internal contacting surfaces of said strip together to form a series of individual filter sacks integrally joined together, said strip being transversely weakened parallel to and adjacent corresponding edges of each of said transverse bonds to provide lines of separation between adjacent sacks.

11. A filter pack for suction cleaners comprising an elongated strip of filter material folded flat with the longitudinal edges of said strip in juxtaposed relation, means bonding said juxtaposed edges together, and means bonding the internal contacting faces of said folded strip together transversely to said edges and at spaced intervals along the length of said strip to form a continuous band of tubular filter sacks each sealed at each end and joined to the adjacent leading and trailing filter sacks, each of said sacks being weakened along a line extending transversely to said edges and adjacent the transverse bonding means forming one end of an adjacent filter sack.

12. In a suction cleaning apparatus having a casing provided with an air inlet and an air outlet and suction producing means for causing air flow through said casing from said inlet to said outlet the combination of, a filter magazine carried by said casing, a filter pack in said magazine comprising a continuous strip of filter sacks each having a closed bottom portion and a mouth portion separably connected to the bottom portion of the preceding filter sack whereby a fresh filter sack may be drawn from said magazine at will as a used filter sack is removed and separated from the mouth portion of a succeeding filter sack, and means for securing the mouth portion of the leading filter sack across the air flow path between said air inlet and said air outlet whereby all air flowing through said air inlet discharges into said leading filter sack.

13. Apparatus according to claim 12 in which said magazine is housed in said casing between said air inlet and said air outlet and including an opening in a wall of said casing providing access to said magazine, and a door on said casing closing said opening.

14. Apparatus according to claim 12 in which said magazine is secured to a filter support member mounted in said casing between said air inlet and said air outlet.

15. Apparatus according to claim 12 including a filter support member carrying said magazine and mounted in said casing between said air inlet and said air outlet, and a member removably attached to said casing and defining said air inlet, means for guiding filters from said magazine into said filter support, and in which said means for securing the mouth portion of said leading filter sack includes a portion of said support.

16. In a suction cleaning apparatus having a casing provided with air inlet and air outlet ports and a filter chamber between said ports, and means for producing an air flow through said ports and said chamber the combination of, a removable plate on said casing defining one of said air ports and providing access to said filter chamber, a filter magazine carried by said casing having a filter outlet opening into said chamber, a strip of filters in said magazine composed of a plurality of filter sacks each having a closed bottom portion and a mouth portion detachably secured to the bottom portion of a preceding filter whereby removal of said plate provides access to a filter chamber and withdrawal of a used filter from said chamber draws a fresh filter from said magazine into said chamber after which the used filter may be detached leaving a fresh filter in said chamber with its mouth portion free, and means including said plate for engaging the mouth portion of a filter in said chamber in surrounding relation to said one port whereby air flowing through said casing is filtered by a filter sack in said chamber.

17. In a suction cleaner having a casing provided with a filter chamber and means for producing a flow of cleaning air through said filter chamber the combination of, a filter magazine carried by said casing and having a filter discharge portion opening into said chamber, a strip of filters in said magazine composed of a plurality of filter sacks each having a closed end and a mouth separably connected to a preceding filter sack in said strip, an opening in said casing providing access to said filter chamber, whereby a used filter may be withdrawn from said filter chamber and separated from said strip and a new filter is drawn from said magazine into said chamber as said used filter is withdrawn, means for closing said opening, and means for securing the mouth portion of the filter sack in said chamber across the air flow path therethrough whereby air flowing through said chamber must pass through said filter sack.

18. In a suction cleaner having a casing provided with a filter chamber and means for producing a flow of cleaning air through said filter chamber the combination of, a filter magazine carried by said casing and having a filter discharge portion opening into said chamber, a strip of filters in said magazine composed of a strip of filter material folded flat with its longitudinal edges engaging and bonded together and having the inside contacting faces of the folded strip bonded together in narrow bands extending transversely to said edges and spaced apart to form a plurality of joined tubular bodies sealed from each other by said transverse bands, an opening in said body providing access to said filter chamber, whereby a used filter may be withdrawn from said chamber through said opening and a fresh filter is drawn from said magazine into said chamber as said used filter is withdrawn and said fresh filter is separated from said used filter adjacent to and on the fresh filter side of the transverse band between them leaving an open end on said fresh filter, and means for closing said opening and securing the open mouth portion of said fresh filter across the air flow path through said filter chamber.

19. In a suction cleaning apparatus having a filter connecting member adapted to be connected to a filter sack for cleaning air flowing through said member and a suction producing means for producing a flow of air through said member, the combination of a strip of filter sacks each having a closed bottom portion and a mouth portion detachably connected to the bottom portion of the preceding filter sack whereby the mouth portion of the leading filter sack is free, means for detachably connecting the mouth portion of said leading filter sack to said connecting member, and a filter support means on said apparatus supporting said strip of filters whereby a fresh filter sack may be drawn from said support means as said leading filter sack is removed and detached from said strip of filters.

20. In a suction cleaning apparatus having a filter connecting member adapted to be connected to discharge air to be cleaned into a filter sack and a suction producing means for producing a flow of air to be cleaned through said member and a filter sack connected thereto, the combination of a filter magazine adapted to support a strip of connected filter sacks, a strip of filter sacks supported by the magazine, said strip of filter sacks comprising a plurality of detachably connected filter sacks each sealed except for an air inlet portion adapted to be connected to said member whereby said filter sacks may be successively withdrawn from the magazine to detach a dirty filter sack from the filter strip and to present the air inlet portion of a successive filter sack for connection to the filter connecting member.

References Cited in the file of this patent

UNITED STATES PATENTS

| | | |
|---|---|---|
| 663,730 | Clawson | Dec. 11, 1900 |
| 893,227 | Davies | July 14, 1908 |
| 1,279,171 | Sullivan | Sept. 17, 1918 |
| 1,783,181 | Birkholz | Dec. 2, 1930 |
| 2,220,873 | Waters | Nov. 5, 1940 |
| 2,338,922 | Fleming | Jan. 11, 1944 |
| 2,524,584 | Zehr | Oct. 3, 1950 |
| 2,532,642 | Senne | Dec. 5, 1950 |
| 2,580,642 | Beede | Jan. 1, 1952 |